United States Patent [19]

LaBeau et al.

[11] 4,342,057
[45] Jul. 27, 1982

[54] SKEW CALCULATION USING INFORMATION RECORDED ALONG A SINGLE TIMING TRACK

[75] Inventors: Gary A. LaBeau, La Mesa; James A. Bixby, San Diego, both of Calif.

[73] Assignee: Eastman Technology, Inc., Rochester, N.Y.

[21] Appl. No.: 159,423

[22] Filed: Jun. 16, 1980

[51] Int. Cl.³ .............................................. G11B 5/43
[52] U.S. Cl. ......................................... 360/76; 358/8; 360/26
[58] Field of Search ...................... 360/76, 26, 73, 36, 360/21; 358/8

[56] References Cited

U.S. PATENT DOCUMENTS

| | | | |
|---|---|---|---|
| 2,937,239 | 5/1960 | Garber, Jr. et al. | 360/76 |
| 3,526,726 | 9/1970 | Corbett et al. | 360/76 |
| 3,843,952 | 10/1974 | Husson | 360/26 |
| 3,877,069 | 4/1975 | Altonji et al. | 360/26 |
| 4,074,332 | 2/1978 | Innes | 360/26 |
| 4,218,713 | 8/1980 | Horak et al. | 358/8 |
| 4,258,398 | 3/1981 | Bixby et al. | 360/76 |

Primary Examiner—Alfred H. Eddleman
Attorney, Agent, or Firm—Robert F. Cody

[57] ABSTRACT

The present invention provides apparatus for calculating the skew distortion introduced in each channel of a multi-channel longitudinal recorder when recorded information signals in at least two channels contain a detectable characteristic. In accordance with the invention, a timing signal is recorded containing certain information that is used, upon playback, to produce a reference marker which is compared with the detectable characteristics of recorded information signals to produce a measure of skew distortion.

4 Claims, 35 Drawing Figures

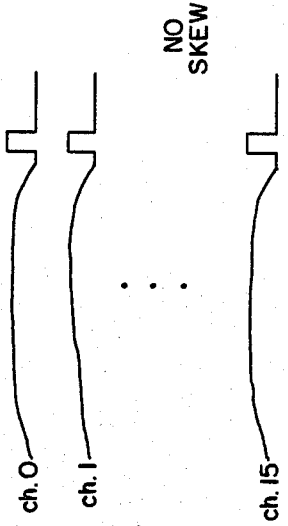
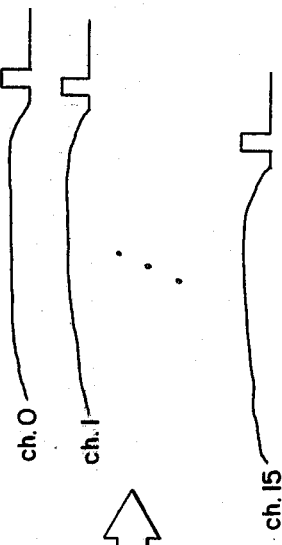
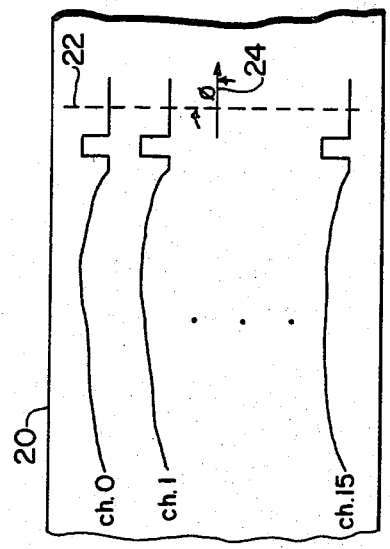
FIG. 1a
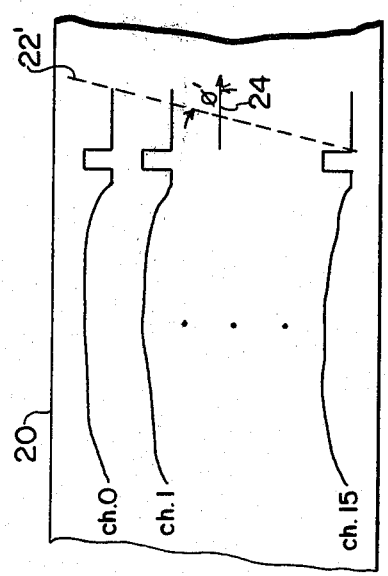
FIG. 1b

SKEW CALCULATION USING INFORMATION RECORDED ALONG A SINGLE TIMING TRACK

FIELD OF THE INVENTION

The present invention relates to apparatus for calculating skew in a multi-channel longitudinal recorder.

Description Relative to the Prior Art

In a multi-channel longitudinal recorder, a multi-channel recording head is used to record information signals along a plurality of tracks on a recording medium such as a magnetic tape. The recorded signals are played back by means of a multi-channel playback head. If the recording and playback heads were perfectly aligned, and if the transport system that advances the recording medium did so at a perfectly uniform velocity, the played back signals would represent a faithful reproduction of the originally recorded information signals. Practical systems, however, are not so perfect.

A conventional multi-channel magnetic (recording or playback) head has a stack of aligned transducer gaps. The alignment of such gaps constitutes a "gap line". The recording and playback heads are perfectly aligned when the respective gap lines have the same angle (e.g., 90 degrees) with respect to the direction of tape advancement. For various reasons, however, the recording and playback heads in practical systems are often not perfectly aligned. Such misalignment has the effect of producing distortion in the form of relative phase errors among the played back information signals.

Such distortion can also be caused by the tape transport system. Specifically, as the tape advances (during recording or playback) it frequently yaws about an axis perpendicular to the plane of its recording surface, thereby introducing relative phase errors similar to those produced by head misalignment. In this case, however, the "misalignment" varies with the tape yaw as a function of time. Whether arising from tape yaw or head misalignment, distortion in the form of phase errors among information signals recorded and played back through separate channels of a multi-channel longitudinal recorder is hereinafter referred to as "skew".

Various patent references address the matter of skew correction. U.S. Pat. No. 3,526,726 discloses a method of skew correction for use with a multi-channel recorder wherein control signals (e.g., sine waves) from a reference source are recorded on outbound tracks of a magnetic tape. Upon playback, error signals are developed by comparing the phases of the reproduced control signals with the control signals produced by the reference source. Skew correction is obtained by applying the error signals to piezoelectric transducers which support the playback head. The piezoelectric transducers bend in response to the error signals causing the playback head to rotate so as to reduce skew.

U.S. Pat. No. 2,937,239 discloses a skew correction technique wherein the phases of control signals recorded on outbound tracks of a magnetic tape are compared upon playback to produce an error signal indicative of skew. The error signal is applied to a servo system that rotates the playback head in such a manner as to compensate for skew.

SUMMARY OF THE INVENTION

In accordance with the present invention, the skew distortion introduced by a multi-channel longitudinal recorder to an information signal of a type having a "detectable characteristic" (defined below) is measured through the use of a single timing signal that contains a reference marker bearing a predetermined time relationship, before recording, to the "detectable characteristic" of the information signal. In accordance with a further aspect of the invention, the skew distortion of information signals recorded in outbound channels is measured directly and used to determine the skew distortion of the remaining information signals by an interpolation process.

BRIEF DESCRIPTION OF THE DRAWINGS

In the detailed description of the preferred embodimemts of the invention presented below, reference is made to the accompanying drawings in which:

FIGS. 1a and 1b are diagrams illustrating the concept of skew;

DESCRIPTION OF THE PREFERRED EMBODIMENTS

Figure 2:
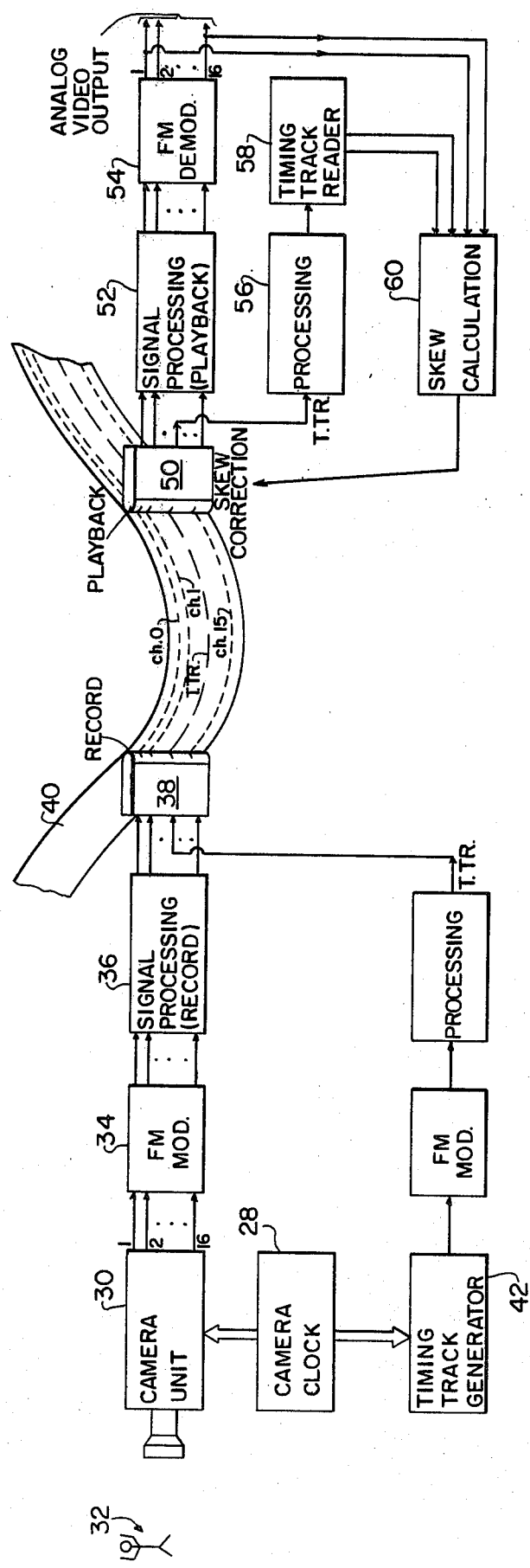
FIG. 2 is a block functional schematic diagram of a video recorder using multi-channel longitudinal recording.

FIGS. 1a and 1illustrate the concept of skew in the context of the playback of a magnetic tape 20 having 16 channels (channel 0 through channel 15) of line sequential video information recorded thereon. It is assumed for purposes of illustration that no skew is introduced during the recording process. In FIG. 1a, the gap line 22 of the playback head makes an angle $\phi$ of 90 degrees with respect to the direction of tape 20 advancement, as indicated by the arrow 24. Upon playback, therefore, the phase relationship of the video signals played back from each of the 16 channels is preserved. In the case shown in FIG. 1b, however, the gap line 22' makes an angle $\phi'$ that is less than 90 degrees with respect to the direction of tape advancement. The result upon playback is to introduce a phase shift (i.e., skew) among the played back video signals.

The present invention provides a technique for calculating the skew distortion introduced by a multi-channel longitudinal recorder that is useful when at least two of the recorded signals contain a "detectable characteristic". By "detectable characteristic" it is meant that a component in the signal can be detected based upon a distinctive quality relative to the remainder of the signal. An example of a detectable characteristic is the horizontal blanking pulses in a standard line sequential video signal.

In the description which follows, the invention is disclosed in the context of a longitudinal video recorder, shown generally in FIG. 2. A camera unit 30 produces sixteen line sequential analog video signals that correspond to a scene 32. The timing of the video signals is controlled by a camera clock 28. A frequency modulator circuit 34 frequency modulates the analog video signals onto a carrier wave. The frequency modulated video signals are processed by a signal processing circuit 36 and then recorded by a record head 38 along longitudinal tracks (channel 0 through channel 15) on a magnetic tape 40. Also recorded along with the video signals is a timing signal produced by a timing track generator 42 based on information received from the camera clock 28. The content of the timing signal and its relation to the video signals produced by the camera 30 are discussed in detail below with reference to FIG. 3. It should be noted at this point, however, that the timing track (T.TR.) is located in the center of the magnetic tape 40.

The recorded information is reproduced by a playback head 50. The video signals are processed by a signal processing circuit 52 and demodulated in a frequency demodulator circuit 54 to produce analog video output signals. The reproduced timing signal is processed in a processing circuit 56 and applied to a timing track reader 58. In a manner described in detail below, the timing track reader 58 extracts certain information from the timing signal which, when combined with information from the channel 0 and channel 15 video signals, enables a skew calculation circuit 60 to determine the skew present in each channel.

Figure 3:
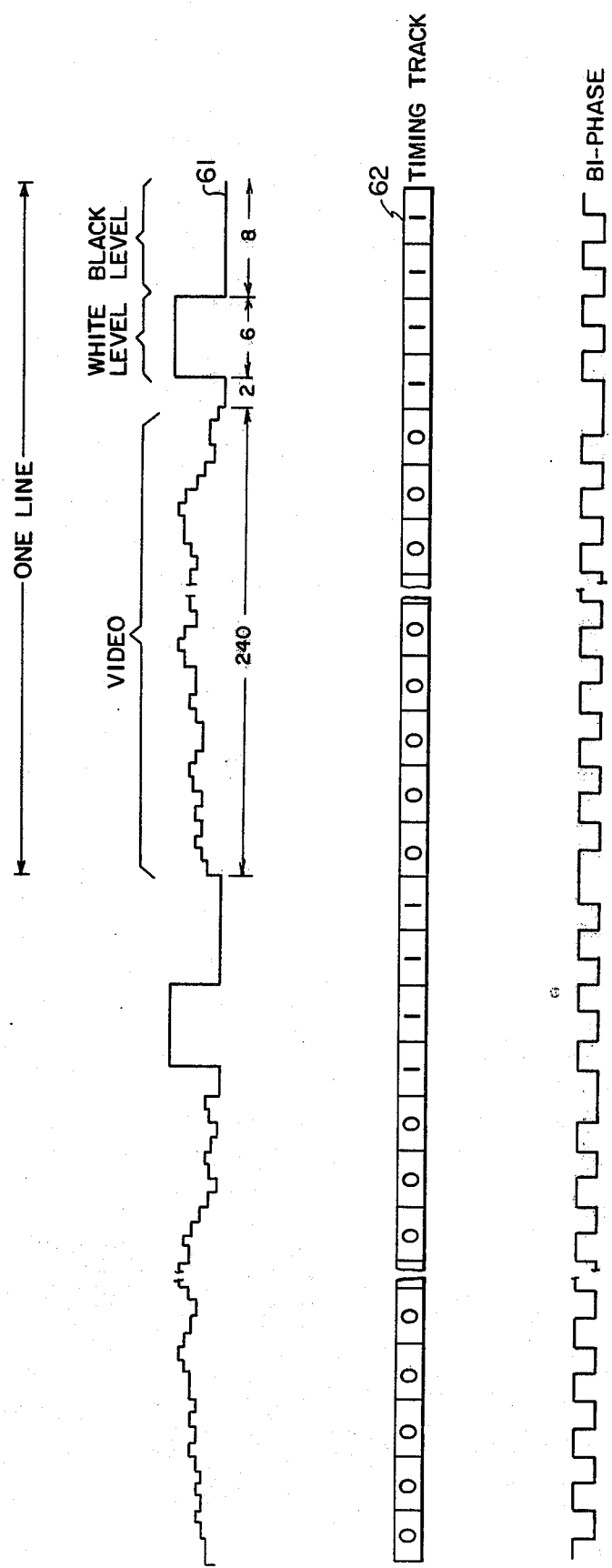
FIG 3 is a diagram showing the relationship between information in a timing signal and information in a video signal.

FIG. 3 shows a portion 61 of a line sequential video signal produced by the camera unit 30 and an example of a corresponding segment of a timing signal 62 produced by the timing track generator 42. Each line of video signal is comprised of 256 picture elements, hereinafter referred to as pixels. Actual video information is carried in the trailing 240 pixels of each line. The detectable characteristic of each line is a white level pedestal, six pixels in width, which follows eight pixels of black level. This pedestal is assumed to represent a white level insert but may, alternatively, represent a blanking pulse, or other line-recurring component of the video signal.

The timing signal recorded along the timing track contains, for each line of video signal, 64 bits of information encoded in bi-phase logic. In bi-phase logic, a zero (low level) is represented by a low to high transition, and a one (high level) is represented by a high to low transition. As is discussed in detail below, bi-phase logic is used so that there will always be a signal transition in the center of each bit. (The bi-phase signal, therefore, will have an average frequency twice that of the original timing signal). Such transitions are used to control both the phase and frequency of a clock that is integral to the disclosed skew correction technique. The first 4 bits of the timing signal corresponding to each line of video signal contain a reference marker code, chosen arbitrarily to be 1111. The remainder of the bits are arbitrarily chosen, for purposes of this example, to be zero.

Figure 4A:
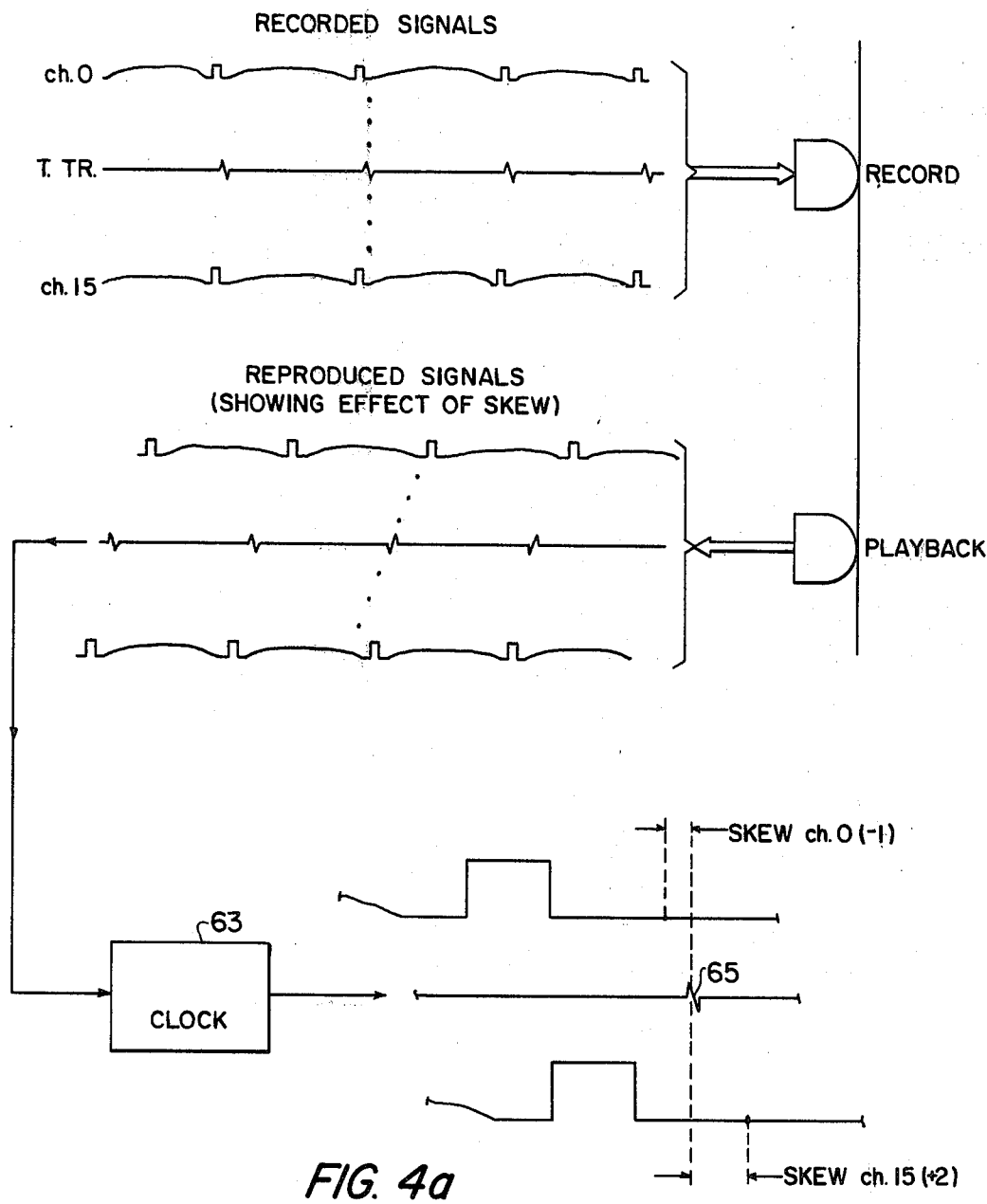
FIGS. 4a and 4b are diagrams that illustrate the concept of skew calculation in accordance with the present invention.

The basic concept of skew calculation in accordance with the present invention is qualitatively illustrated in FIG. 4a. The recorded information is comprised of 16 channels of video signal information and a timing signal. Upon playback, because of tape yaw and head alignment errors, the 16 channels of video signal information and the timing signal become skewed relative to each other. To determine the amount of skew present in each channel, the timing signal is used to drive a clock 63 that produces a reference marker 65 marking the nominal (no skew) position of the center of the eight pixel black level signal. To calculate skew, the position of the reference marker 65 relative to the actual position of the center of the black level signal is measured (in a manner discussed in detail below) for the outbound channels (channel 0 and channel 15). Such measurement gives the actual skew values for channel 0 and channel 15. The skew values for the remaining channels are determined by linear interpolation, see FIG. 4b. Such skew determination is repeated for each reproduced line of video signal.

It was noted above that the timing signal is recorded in a channel that is located approximately midway between the outbound channels. This is because skew most frequently results from yaw about an axis perpendicular to the recording surface which is centered (widthwise) on the magnetic tape. Under such conditions, recording the timing signal along a track that is located approximately midway between the outbound channels ensures that the skew value measured for each outbound channel will be relatively large, thereby increasing the accuracy of the skew measurement. It will be apparent to those skilled in the art, however, that it is not necessary to so record the timing signal and that the present invention enables skew to be calculated irrespective of the position of the axis of tape yaw.

Figure 5:
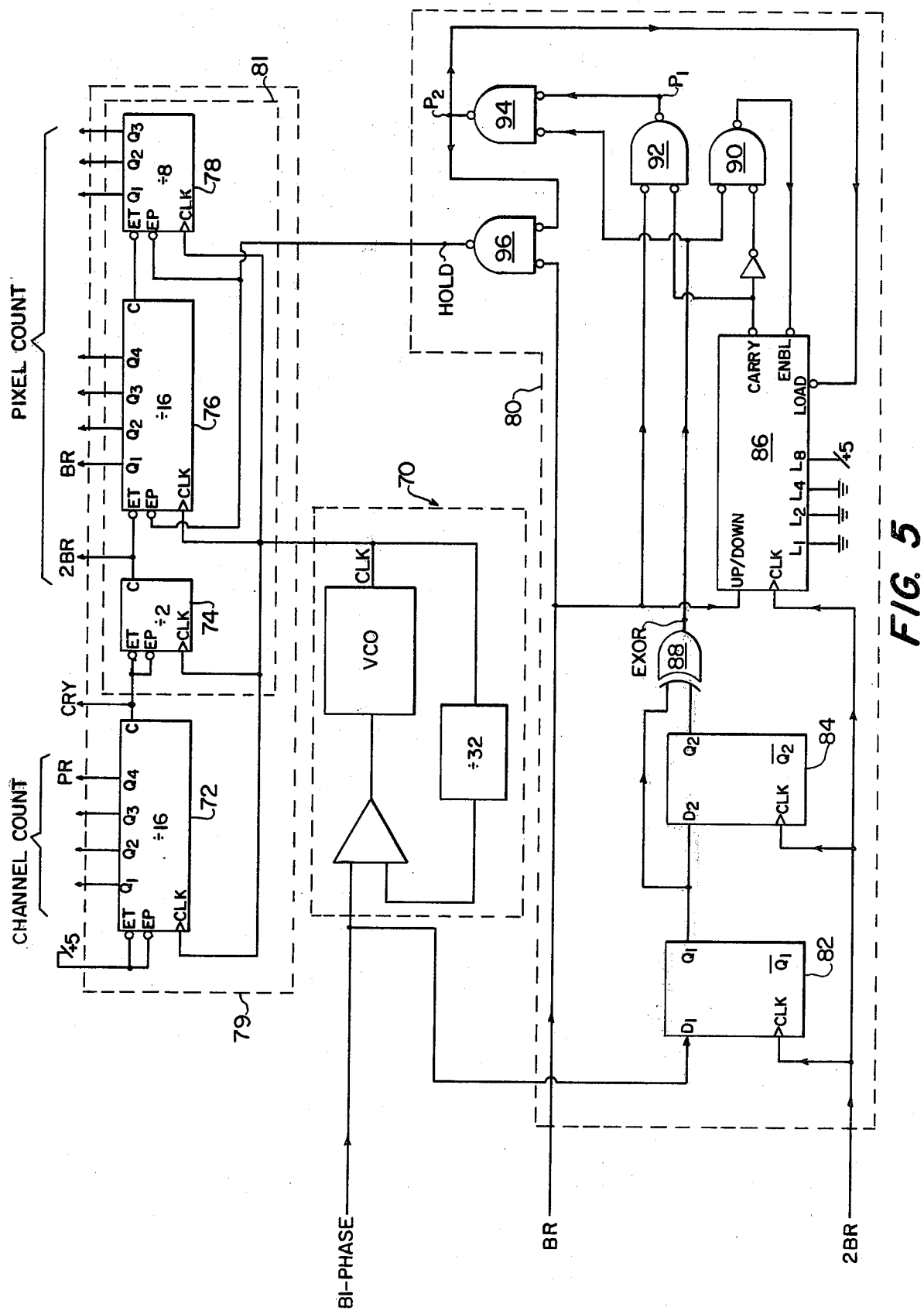
FIG. 5 is an electrical schematic diagram of a counting circuit in accordance with the present invention.
Figure 9:
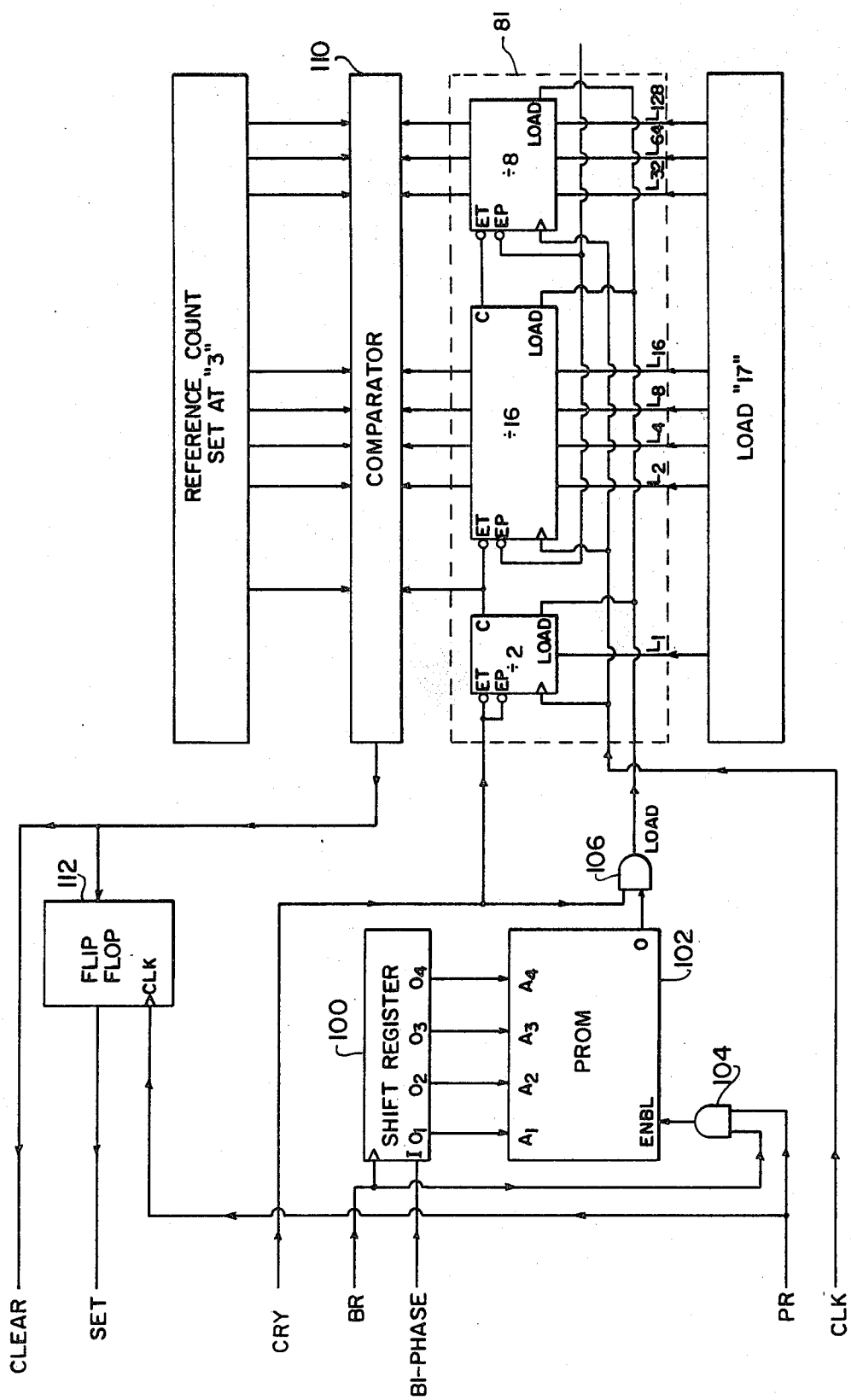
FIG. 9 is an electrical schematic diagram of a circuit that recognizes the occurrence of a reference marker code in a timing signal and causes a preset value to be loaded into a counter that is used in the circuit of FIG. 5.

FIG. 5 shows a portion of the timing track reader 58 referred to in FIG. 2. The reproduced bi-phase encoded timing signal is applied to a phase-lock loop circuit 70 to produce a CLK signal having a frequency 32 times higher than the frequency of the incoming bi-phase signal. Because the bi-phase signal has a frequency of transitions twice that of the timing signal bit rate, the CLK signal has a frequency 64 times higher than the timing signal bit rate. The CLK signal is used to clock a multistage counter 79 comprised of individual counters 72, 74, 76 and 78. (For purposes of clarity, load inputs to these counters, which are discused later in connection with FIG. 9, are not shown in FIG. 5.) Because the pixel rate of the video signal is four times faster than the timing signal bit rate, the $Q_4$ output line of the counter 72 counts at the pixel rate (PR). Similary, the carry output C of the counter 74 counts at twice the timing signal bit rate (2BR), while the $Q_1$ output line of the counter 76 counts at the timing signal bit rate (BR). These output lines serve as the sources for the PR, 2BR and BR clocking signals that are used in certain circuits described below.

Figure 6:
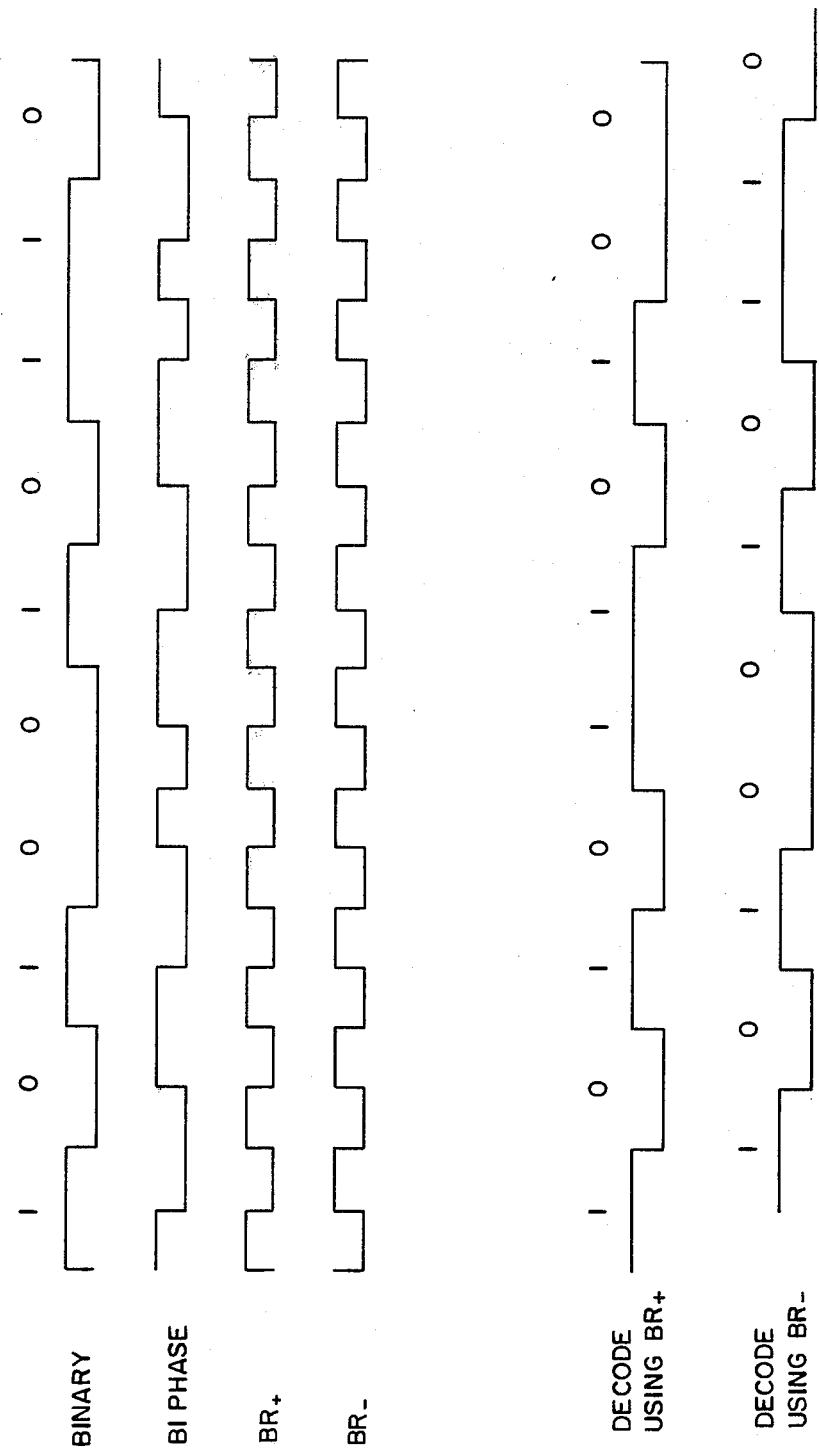
FIGS. 6, 7a thru 7m and 8a thru 8m are timing diagrams useful in explaining the operation of the circuit shown in FIG. 5.

The BR clocking signal is used to decode the bi-phase encoded timing signal. While the BR clocking signal has a frequency equal to the timing signal bit rate, its phase can take on two values, 180 degrees apart. Unless the phase of the bit rate clocking signal is such that positive edge transitions (or negative edge transitions, depending on the logic of the decoding circuitry) occur at the center of each timing signal bit, proper decoding cannot take place. This concept is illustrated in FIG. 6. A ten digit binary signal, 1010010110, is converted to its bi-phase equivalent. The two possibilities for the BR clocking signal are labeled as $BR_+$ and $BR_-$. It is assumed that the logic of the decoding circuitry (not shown in FIG. 6) is such that the positive-edge (low to high) transition of the BR clocking signal is used for decoding, and that at each positive-edge transition the decoded output takes on the value of the bi-phase signal just prior to the transition. If the $BR_+$ clocking signal is used for decoding, the resultant signal is the ten digit binary number 1010110100, which does not match the originally encoded binary number 1010010110. Using the $BR_-$ clocking signal, however, results in the desired decoded binary number 1010010110.

Figure 7:
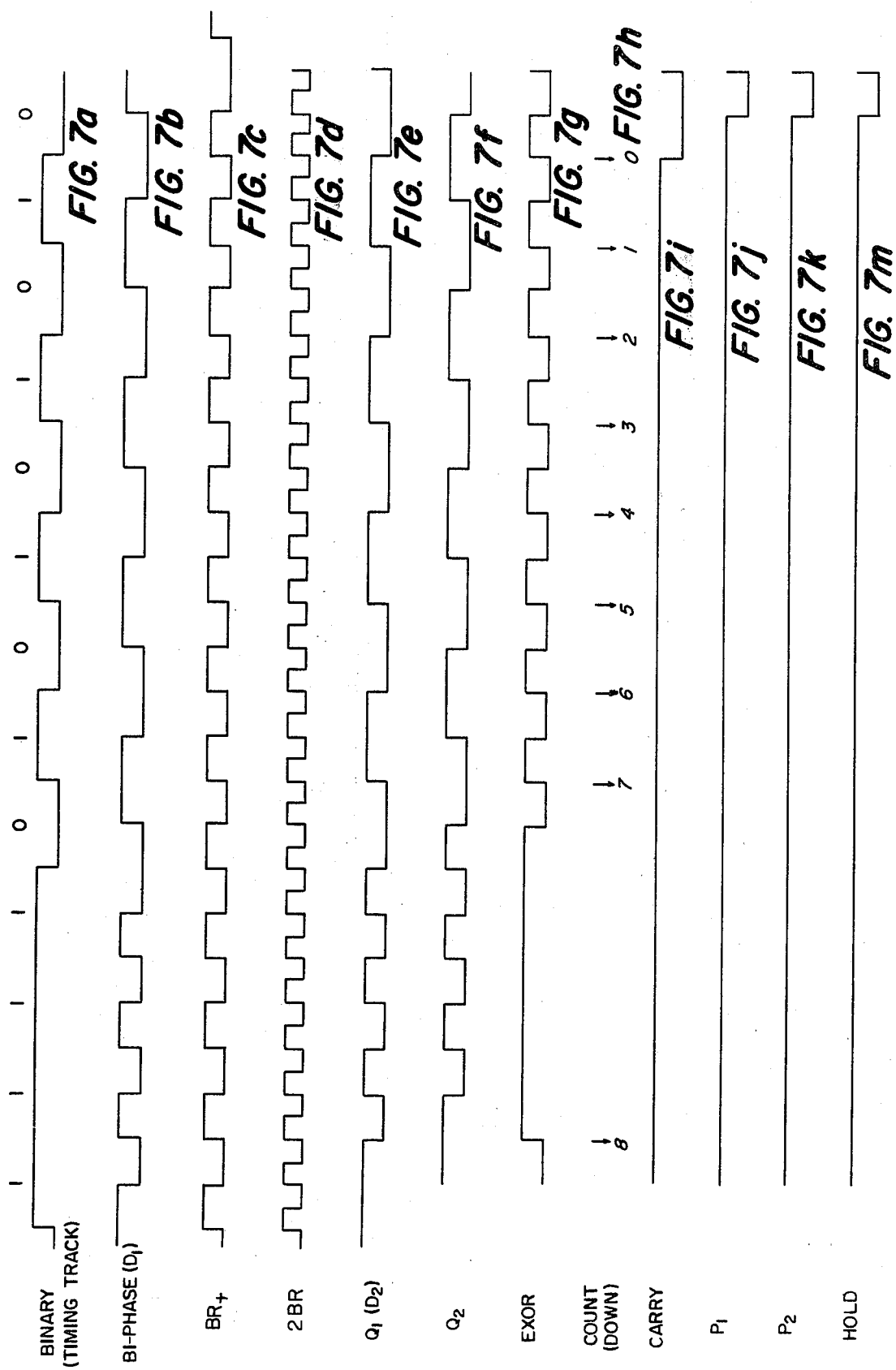

Referring again to FIG. 5, the intitial BR clocking signal (of either phase) is applied to a sub-circuit 80. The function of the sub-circuit 80 is to determine if the BR clocking signal has the proper phase and, if not, to disable the counters 74, 76 and 78 (hereinafter referred to collectively as a pixel counter 81) for one-half a cycle of the timing signal bit rate. Such disablement will shift the phase of the BR clocking signal by 180 degrees to the proper phase. FIGS. 7a through 7m show waveforms at certain points in the subcircuit 80, assuming an initial $BR_+$ clocking signal (FIG. 7c). A 2BR clocking signal (FIG. 7d) drives a pair of D-type flip-flops 82, 84 and an up/down counter 86. The bi-phase signal (FIG. 7b) corresponding to the original timing signal data (FIG. 7a) is applied to the $D_1$ input line of the flip-flop 82. (For purposes of this discussion, the timing track data contains a reference marker code 1111 which is followed by a series of data bits that alternate between zero and one.) At each positive edge transition of the 2BR clocking signal, the signal at the $D_1$ input is passed to the $Q_1$ output line of the flip-flop 82 (FIG. 7e). Similarly, at each positive edge transition of the 2BR clocking signal, the signal at the $D_2$ input line of the flip-flop 84 (also FIG. 7e) is passed to the corresponding $Q_2$ output line (FIG. 7f). An exclusive OR gate 88 compares the signals at the $Q_1$ and $Q_2$ output lines, and produces an output signal (EXOR) that is shown in FIG. 7g.

The counter 86 is initially loaded with a count of eight. If the counter 86 is enabled (by a low logic state), it will count up or down at each positive edge transition of the 2BR clocking signal, depending on whether the BR clocking signal is high or low, respectively. The enable condition is determined by a NAND gate 90 which compares the inverted carry of counter 86 with the output of the exclusive OR gate 88. Because the counter 86 is initially loaded to an eight count, the inverted carry output is low which causes the enable input of the counter 86 to follow the output of the exclusive OR gate 88 (FIG. 7g). The resulting count sequence is shown in FIG. 7h, wherein it is seen that the counter 86 counts down to 0.

When the counter 86 increments to 0, the carry output goes low (FIG. 7i), enabling a NAND gate 92. The output ($P_1$) of the NAND gate 92 thus goes low following the $BR_+$ clocking signal, as shown in FIG. 7j. When the output ($P_1$) of the NAND gate 92 goes low, a NAND gate 94 is enabled, the output ($P_2$) of which (see FIG. 7k) then follows the output (EXOR) of the exclusive OR gate 88. But as the output ($P_2$) of the NAND gate 94 goes low, the counter 86 is re-loaded with a count of eight, thereby returning the carry output to the high state (FIG. 7i). This causes the outputs ($P_1$ and $P_2$, respectively) of NAND gates 92 and 94 to return to the high state, as shown in FIGS. 7j and 7k respectively. The sub-circuit 80 is now in its initial state. During the period, however, when the output ($P_2$) of the NAND gate 94 was low (FIG. 7k), the $BR_+$ clocking signal (FIG. 7c) also went low, thereby producing a low going HOLD signal at the output of a NAND gate 96, shown in FIG. 7m. The HOLD signal is low for one-half cycle of the $BR_+$ clocking signal, and causes the counters 76 and 78 to be disabled for one-half the $BR_+$ cycle. Such disablement causes the phase of the $BR_+$ clocking signal to be shifted by 180 degrees, thereby assuming the phase of the $BR_-$ clocking signal.

Figure 8:
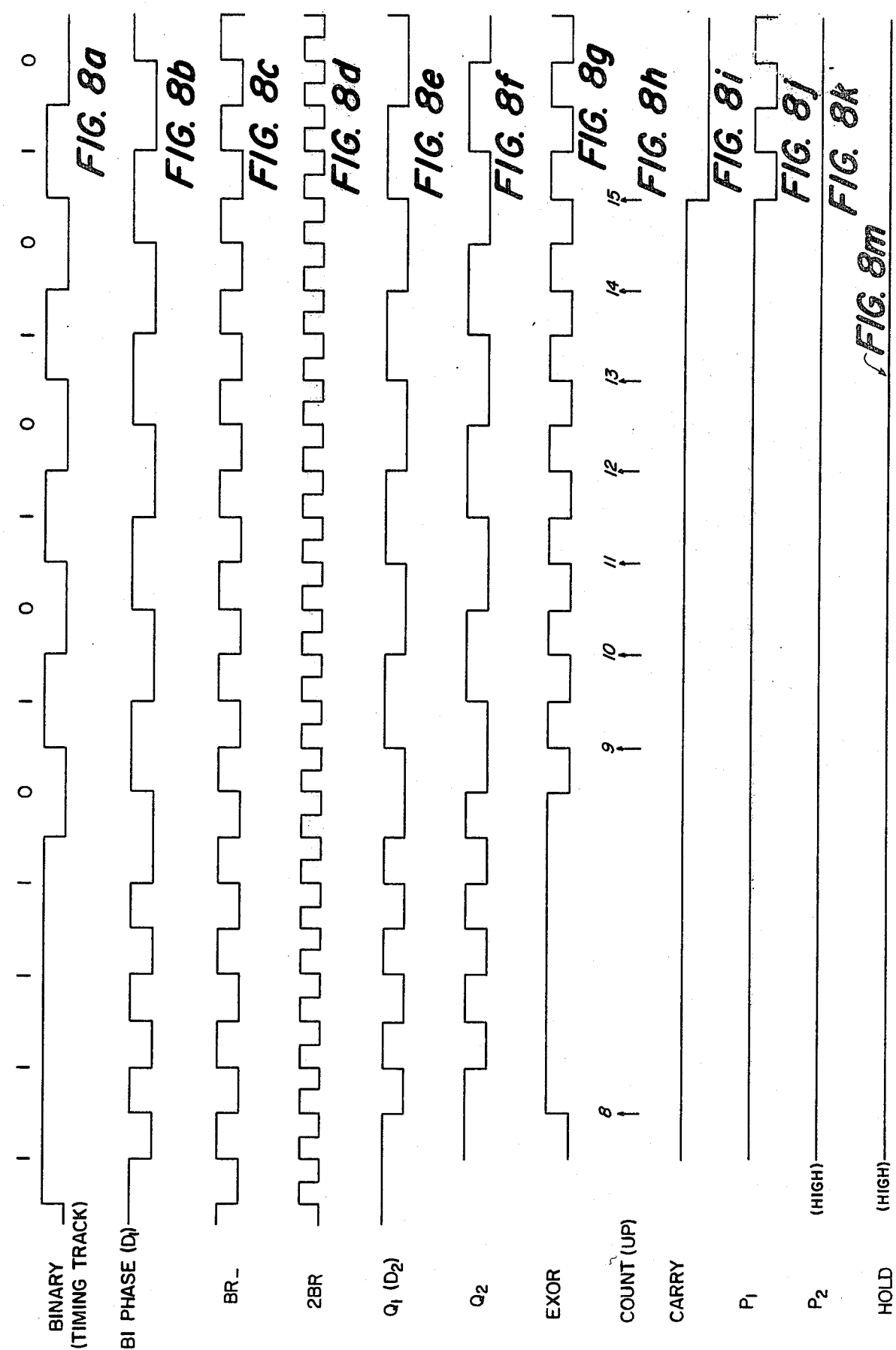

FIGS. 8a through 8m illustrate what happens when the $BR_-$ clocking signal (waveform, FIG. 8c) is applied to the sub-circuit 80. All of the other waveforms shown in FIGS. 8a through 8g are identical to those already discussed in connection with FIGS. 7a through 7g, respectively. The counter 86, in this instance however, counts up instead of down (compare FIG. 8h with FIG. 7h) because of the phase difference between the $BR_-$ and $BR_+$ clocking signals. When the counter 86 reaches 0, the carry output goes low (FIG. 8i). This enables the NAND gate 92, thereby causing its output ($P_1$) to go low (FIG. 8i) and follow the BR clocking signal. This time, however, the output ($P_2$) of the NAND gate 94 remains high because, as seen from FIGS. 8g and 8j, at no time are both of its inputs low. Since the output of the NAND gate 94 stays high, the counter 86 is not re-loaded. As a result, its inverted carry stays high, holding the counter 86 in a disabled condition. It is seen from FIG. 8m that the HOLD signal remains in the high state, thereby permitting the counters 76 and 78 to operate without interference.

To summarize the operation of the sub-circuit 80: By comparing clocking signals with bi-phase encoded timing signal data, a HOLD signal is produced. If the clocking signals have an incorrect phase relative to the bi-phase encoded timing signal, the HOLD signal disables the most significant bits of the pixel counter 81 for a time sufficient to correct the phase of the clocking signals. As long as the clocking signals have the proper phase, the sub-circuit 80 has no effect on the pixel counter 81.

The eight bit pixel counter 81 increments from 0 to 255 at the pixel rate. For reasons discussed below, it is necessary to synchronize this count with the location of the pixel that is being reproduced by the playback head, which location is hereinafter identified by a pixel count. Referring to FIG. 9, the bi-phase encoded timing signal is clocked at the bit rate into a serial input, parallel output shift register 100. The data appearing on the shift register output lines $O_1$ through $O_4$ is applied to address lines $A_1$ through $A_4$ of a PROM 102. The BR and PR clocking signals are gated together in an AND gate 104 to produce an enable signal that is applied to the enable input of the PROM 102. The PROM 102 is thus enabled once each bit cycle for a duration equal to one-fourth of the bit cycle. The PROM is programmed such that an output line "O" goes low only when the PROM 102 is addressed with the reference marker code 1111. Because the reference marker code occupies the first four bits of each segment of the timing signal that corresponds to a line of video signal, and because the video pixel rate is four times the timing signal bit rate, the pixel count is 16 when the reference marker code appears on the address lines $A_1$ through $A_4$ of the PROM 102. The prom output line "O" goes low, therefore, when the pixel count is 16. An AND gate 106 compares the PROM 102 output signal with the carry output signal (CRY) from the counter 72 (shown in FIG. 5).

The result is a LOAD signal which goes low during the period in which the output line "O" goes low, but remains low for a duration no greater than one CLK signal period. The low going LOAD signal causes a "17" to be loaded into the pixel counter 81. The reason a "17" is loaded into the pixel counter 81 is that the counter is not actually loaded until the carry output (CRY) of the counter 72 goes low, and this does not occur until one pixel count after the output of the PROM 102 goes low. Once the pixel counter 81 has been so loaded, its count is synchronized with the pixel count.

Because the pixel counter 81 is synchronized with the pixel count that would occur if no skew were present, a count of four marks the nominal position of the middle of the eight pixel black level in each line of video signal. To produce a signal that corresponds to this position, a comparator 110 compares the count of the pixel counter 81 with a reference count of three. Each time the pixel counter 81 counts to three, the comparator 110 produces a low going output pulse referred to as a CLEAR signal. The CLEAR signal is delayed one pixel count by a flip-flop 112 to produce a SET signal, which marks the nominal center of the eight pixel black level.

Figure 10:
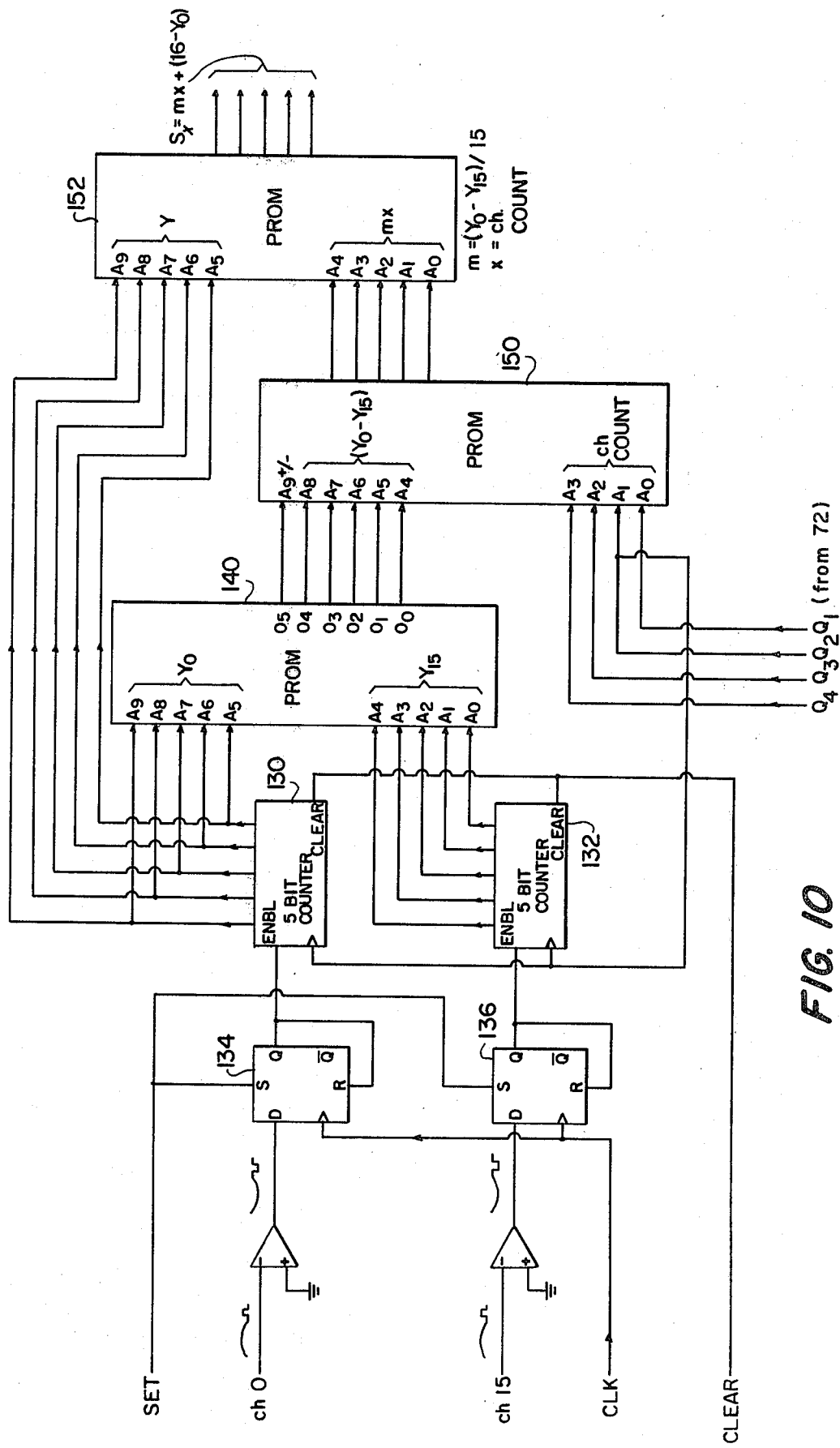
FIG. 10 is an electrical schematic diagram of a circuit in accordance with the invention that calculates, via an interpolation technique, the value of skew present in each channel of a multi-channel longitudinal recorder.

The circuit shown in FIG. 10 uses the SET and CLEAR signals, the CLK signal, and the video signals from channel 0 and channel 15 to compute the actual value of skew present in channel 0 and channel 15. From these two skew values, the skew present in the remaining channels is computed by linear interpolation. The video signals from channel 0 and channel 15 are applied, after inversion, to the D-input lines of a pair of D-type flip-flops 134 and 136, respectively. Because of inversion, the eight pixel black level signal corresponds to a high logic state, while the six pixel white level signal corresponds to a low logic state. When the pixel count reaches three, the CLEAR signal clears a pair of 5-bit counters 130 and 132. One pixel count later, the SET signal sets the flip-flops 134 and 136, causing their respective Q output lines to go high and enable the counters 130 and 132. As a result, both counters 130 and 132 start counting when the pixel count reaches four, which corresponds to the nominal center of the black level signal in the video signal. Because the counters 130 and 132 are clocked by the second least significant bit of the channel count (the outputs of the counter 72, see FIG. 5), the counters 130 and 132 increment at a rate four times as fast as the pixel rate. This results in calculation of a skew correction value to within one-fourth of a pixel period. Both counters continue to increment until the leading edge of respective white level signals reach the D-inputs of the flip-flops 134 and 136, at which time the Q output lines go low and disable the counters 130 and 132. Due to the presence of skew, the signals in channel 0 and channel 15 will not, in general, be in phase. As a result, the counters 130 and 132 will shown different counts after being disabled. If no skew is present, each counter will show a count of 16 (because each counter would increment for four pixel counts at four times the pixel rate). In the case of positive values of skew, the count will be less than 16 (but greater than or equal to zero), while negative skew will result in a count higher than 16 ( but less than or equal to 32).

A measure of the skew in channel 0 and channel 15 is given by the count stored in the counters 130 and 132, respectively. Letting $Y_o$ stand for the count stored in the counter 130, the actual skew value (as defined in FIG. 5) for channel 0 is $16-Y_o$. Similarly, $16-Y_{15}$ is the skew value for channel 15. To calculate the skew value for the remaining channels, it is assumed that the skew is linear across the tape. (This assumption is correct to a high degree of accuracy if there is no tape stretch.) A PROM 140 is programmed so that when addressed with the counts $Y_o$ and $Y_{15}$, the difference $Y_0-Y_{15}$ is produced on its output lines. A second PROM 150 is programmed to accept the difference $Y_o-Y_{15}$ and the channel count as address data, and to produce output data corresponding to mx, where m equals $(Y_o-Y_{15})/15$ and x represents the channel count. A third PROM 152 computes the skew value S for each channel: $S=mx+(16-Y_0)$. Because the channel count increments 16 times as fast as the pixel count, the skew values for all 16 channels are computed within one pixel count after the counters 130 and 132 are disabled.

Figure 4B:
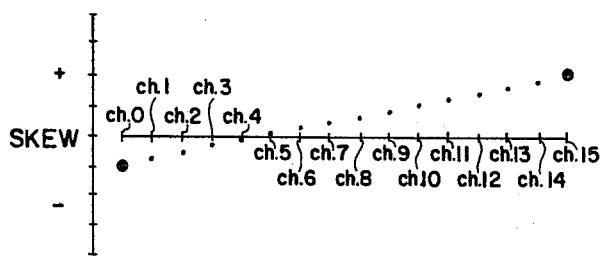

As an example of such skew calculation, consider the skew condition illustrated in FIG. 4b. The measured skew values for channel 0 and channel 15 are $-1$ and $+2$, respectively. For channel 0, therefore $16-Y_o=-1$, so $Y_o=17$. By a similar calculation, $Y_{15}=14$. The quantity "m", which is the slope of a straight line passing through the skew values for channel 0 and channel 15, is given by $m=(Y_o-Y_{15})/15=0.2$. Thus, the skew values, S, for all channels are calculated from the equation $S=0.2x-1$.

Figure 11:
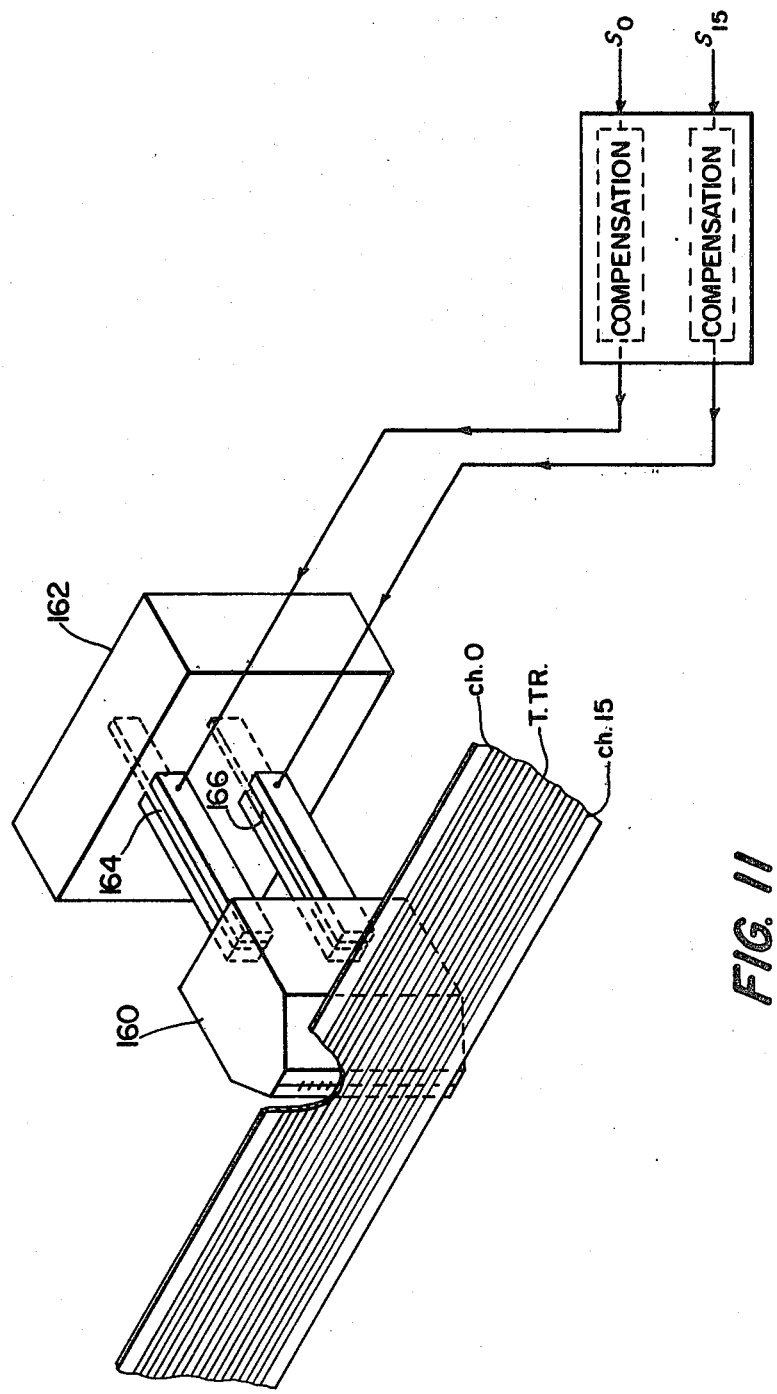
FIG. 11 is a diagram illustrating one method of correcting for skew using skew values calculated by the circuit shown in FIG. 10.

For each successive line of video signal the skew calculation is repeated. The skew values thus calculated can be used to compensate for skew by any number of methods. As an example of one such method, FIG. 11 shows a multi-channel playback head 160 mounted to a supporting member 162 by a pair of piezoelectric tranducers 164 and 166. In this case, the skew values $S_o$ and $S_{15}$ calculated in accordance with the invention for channel 0 and channel 15 are applied, after compensation, to respective piezoelectric transducers 164 and 166. In response, the piezoelectric transducers bend, thereby causing the playback head 160 to tilt in such a manner as to eliminate the detected skew.

An example of a skew correction technique that would use the skew values calculated for all channels is the use of an electronically variable delay line in the playback signal processing circuitry for each channel. The skew values computed for each channel would be used to adjust the respective time delays, thereby shifting the relative phases of the channel signals in such a manner as to compensate for the effect of skew.

The invention has been described in detail with particular reference to preferred embodiments thereof, but it will be understood that variations and modifications can be effected within the spirit and scope of the invention. For example, the timing signal may include a reference marker that occurs after, rather than before (as in the above embodiments), the detectable characteristic of the information signal. In this case, the SET signal is produced upon detection of the detectable characteristic, and the counters 130 and 132 (FIG. 10) are disabled in response to the detection of the reference marker.

What is claimed is:

1. Apparatus for use in measuring the skew distortion of first and second information signals that are recorded on magnetic tape and played back from said tape through first and second channels of a multi-channel longitudinal recorder, said information signals each having a recurring detectable characteristic, said apparatus comprising:

(a) means for producing a timing signal that is recordable by said multi-channel longitudinal recorder, said timing signal having a plurality of reference markers each bearing, before the recording of said timing signal, a predetermined time relationship to a detectable characteristic in each of said first and second information signals;

(b) means for recording said timing signal on said magnetic tape and playing back said timing signal from said magnetic tape through a third channel of said multi-channel longitudinal recorder; and (c) means for measuring, upon playback of said information and timing signals, the time relationship between the reference markers and corresponding detectable characteristics in each of said first and second information signals, thereby providing a measure of the skew introduced by said multi-channel longitudinal recorder to said first and second information signals relative to said timing signal, said time relationship measuring means comprising:

first and second counters each of which increments at a predetermined clocking rate in response to an enable signal, and each of which stops incrementing in response to a disable signal;

means for detecting the played back reference markers of said timing signal;

means for detecting the played back detectable characteristics of said first and second information signals;

means for producing a first enable signal in response to the first detected of a reference marker or a detectable characteristic of said first information signal, and for applying said first enable signal to said first counter;

means for producing a second enable signal in response to the first detected of a reference marker or a detectable characteristic of said second information signal, and for applying said second enable signal to said second counter;

means for producing a first disable signal in response to the second detected of a reference marker or a detectable characteristic of said first information signal, and for applying said first disable signal to said first counter; and means for producing a second disable signal in response to the second detected of a reference marker or a detectable characteristic of said second timing signal, and for applying said second disable signal to said second counter.

2. Apparatus as claimed in claim 1 further comprising:

means for determining the skew distortion of information signals recorded and played back through channels of said multi-channel longitudinal recorder other than said first and second channels, said skew distortion determining means including means for interpolating between the measures of skew for information signals in said first and second channels.

3. Apparatus as claimed in claim 2 wherein said first and second channels correspond to outbound tracks of said magnetic tape of said multi-channel longitudinal recorder, and wherein said interpolation means includes linear interpolation means for determining the skew distortion of channels corresponding to tracks of said magnetic tape between said outbound tracks by linear interpolation based on the skew values measured for said first and second channels.

4. Apparatus as claimed in claim 3 wherein said third channel corresponds to a track on the magnetic tape that is located approximately midway between said outbound tracks.

* * * * *